US012065822B2

(12) United States Patent
Munn

(10) Patent No.: US 12,065,822 B2
(45) Date of Patent: Aug. 20, 2024

(54) RAG RELIEF FOR OVERFLOW SCREEN

(71) Applicant: SAMATEK LIMITED, Swansea (GB)

(72) Inventor: Samuel Munn, Swansea (GB)

(73) Assignee: Samatek Limited, Swansea (GB)

( * ) Notice: Subject to any disclaimer, the term of this patent is extended or adjusted under 35 U.S.C. 154(b) by 102 days.

(21) Appl. No.: 17/436,987

(22) PCT Filed: Mar. 20, 2020

(86) PCT No.: PCT/GB2020/050751
§ 371 (c)(1),
(2) Date: Sep. 7, 2021

(87) PCT Pub. No.: WO2020/188295
PCT Pub. Date: Sep. 24, 2020

(65) Prior Publication Data
US 2022/0178131 A1 Jun. 9, 2022

(30) Foreign Application Priority Data
Mar. 21, 2019 (GB) ..................... 1903930

(51) Int. Cl.
E03F 5/12 (2006.01)
E03F 5/14 (2006.01)
(52) U.S. Cl.
CPC ............ E03F 5/125 (2013.01); E03F 5/14 (2013.01)
(58) Field of Classification Search
CPC .... E03F 5/125; E03F 5/14; E03F 1/00; H04L 67/306; H04L 67/52; H04L 49/15;
(Continued)

(56) References Cited

U.S. PATENT DOCUMENTS 6,491,830 B1 * 12/2002 Batten ................ B01D 21/2461
210/803
6,849,176 B1 * 2/2005 Batten .................... B01D 17/00
210/256

(Continued)

FOREIGN PATENT DOCUMENTS

CA 315118 A 9/1931
CN 102515324 A 6/2012
(Continued)

OTHER PUBLICATIONS

Examination Report in GB1903930.4 dtd Aug. 14, 2019.
(Continued)

Primary Examiner — Ekandra S. Miller-Cruz
(74) Attorney, Agent, or Firm — Crowe & Dunlevy, P.C.

(57) ABSTRACT

The present invention relates to a venturi device for a combined sewage overflow system, the venturi device comprising: a body defining a fluid passageway therethrough, the body having a first end portion defining a fluid inlet; a second end portion opposing the first end portion, the second end portion defining a fluid outlet and an opposing venturi inlet in fluid communication with the fluid outlet: and a mid-portion located between the first and second end portions; and a venturi pipe located between the first fluid outlet and the venturi inlet and in fluid communication with both, wherein the venturi pipe is narrower in cross section than the venturi inlet, and wherein the fluid inlet comprises an intake funnel that decreases in width in a direction towards the fluid passageway. The present invention further provides a CSO system including such a venturi device.

7 Claims, 6 Drawing Sheets

(58) Field of Classification Search
CPC ... H04L 49/25; H04L 63/0209; H04L 63/105; H04W 4/023; H04W 4/21; B01D 29/94; C02F 1/00
USPC .................................................. 210/170.03
See application file for complete search history.

(56) References Cited

U.S. PATENT DOCUMENTS

| | | |
|---|---|---|
| 2005/0035050 A1 | 2/2005 | Froud |
| 2013/0081934 A1 | 4/2013 | New |
| 2020/0378199 A1* | 12/2020 | Weber ................ B01D 19/0042 |

FOREIGN PATENT DOCUMENTS

| | | |
|---|---|---|
| CN | 102696330 A | 10/2012 |
| CN | 205519050 U | 8/2016 |
| DE | 202005007496 U1 | 9/2005 |
| EP | 2766527 A1 | 8/2014 |
| GB | 2405817 A | 3/2005 |
| KR | 20030069345 A | 8/2003 |
| KR | 20160012475 A | 2/2016 |
| KR | 20190017432 A | 2/2019 |
| RU | 2609382 C1 | 2/2017 |
| SU | 947313 A1 | 7/1982 |

OTHER PUBLICATIONS

Int'l Search Report in PCT/GB2020/050751 dtd Jun. 2, 2020.
Examination Report in GB2004144.8 dtd Sep. 9, 2020.
Examination Report in GB2108309.2 dtd Jul. 15, 2021.

* cited by examiner

SECTION B-B

SECTION A-A

SECTION C-C

SECTION D-D

SECTION C-C

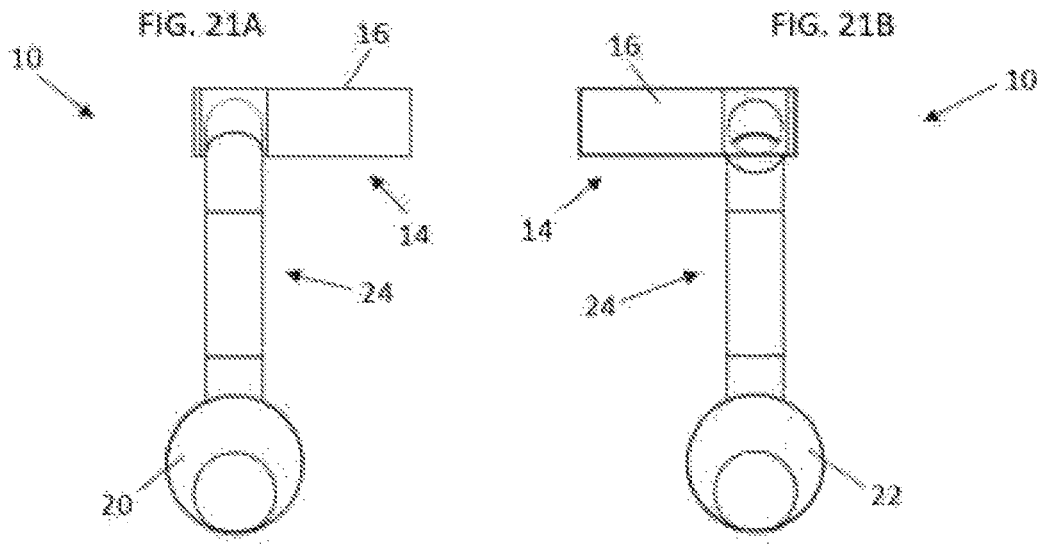
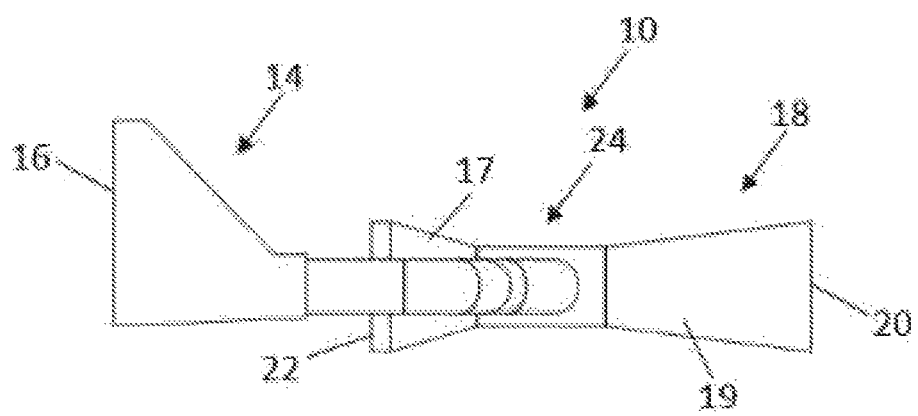

RAG RELIEF FOR OVERFLOW SCREEN

BACKGROUND TO THE INVENTION

The present invention relates to a venturi device for a combined sewage overflow system and a combined sewage overflow system incorporating such a venturi device.

There are approximately 31,000 Combined Sewer Overflows (CSOs) around the UK, their sole purpose being to discharge untreated human sewage and waste-water when the sewerage system is overloaded. CSOs act as emergency discharge valves in the sewerage system, discharging untreated sewage and wastewater during periods of intense rainfall when the system becomes overloaded, such as in times of flooding. In the absence of CSOs throughout the sewerage system, sewage could start backing up further upstream, e.g. in houses and gardens. Therefore, they are a vital component of the sewerage infrastructure.

In many drainage systems, surface water, i.e. rainwater from roofs, yards and road surfaces, and foul (sewage and trade) effluent flows are combined with the foul sewer network. In situations of increased rainfall, such combined sewers reach hydraulic capacity and a release mechanism is required in order to prevent upstream areas (e.g. domestic properties and gardens and commercial premises) from becoming flooded with diluted sewage.

Such a release mechanism is provided by the incorporation of CSOs in these sewerage systems.

CSOs are intended to operate intermittently and only in response to very heavy rainfall and flooding events. When in operation, they may discharge excess water from the sewerage system into inland, coastal or transitional (i.e. estuarine) waters.

Conventional CSO's operate using a screening method to prevent sewage solids and rag from being discharged along with excess water. Rag is a term for non-excrement solid waste such as J cloths, paper, cotton buds and the like. Under normal conditions, sewage flows into the CSO where the (effluent) water level remains below the level of the screen and flows onward through the sewerage system for treatment at the Utility Treatment Works. However, under flooding conditions, the Network may surcharge (overload) and the water backs up resulting in the water level in the CSO rising. At a designed water level, the passes over a weir wall through a screen into an escape chamber and is expelled from the CSO into the environment. The screen prevents sewage solids and rag passing into the escape chamber and thus, they are prevented from being released into the environment.

However, over time, due to heavy or prolonged use, the screens gradually become blocked (or blinded) due to a buildup of sewerage solids and rag.

As this is a well-known issue, CSO's are typically provided with a bypass overflow weir wall set at a higher level that has no screening device over through which sewerage can pass into the escape chamber if the screen is blocked. However, when this happens, sewerage solids and rag are also able to flow through this bypass into the escape chamber and are expelled from the system and into the watercourse. This is clearly very undesirable, unhygienic and unacceptable.

There have been several attempts to address this problem. For example, static screens can be increased in screen area to slow down the rate at which the screens will become blocked. Such oversized screens are often employed where there is regular flooding activity or where the incoming sewage is likely to be highly loaded with debris.

Alternatively, screens maybe mechanically raked. However, even when the mechanical raking is automated or assisted by sewage flow, screen blocking remains a common problem. As the very specific design of a CSO ensures that the inflow mixture is trapped in the screen chamber where the only way out is through the screen, it is inevitable that the trapped mixture becomes an ever-increasing thicker mixture, placing an increasingly heavier burden on the screen until screen blockage is unavoidable.

There is therefore a need for a method of reducing the solids content of the screen chamber effluent and relieving the burden on the screen. The CSO screen is thus presented with a 'cleaner' fluid which promotes the performance, efficiency and life of the screen operation. Such a method would be a clear advantage to assist with the prevention of sewage solids and rag from entering the waterways and also provides a means of assist the screen from becoming blocked by such sewage solids and rag.

SUMMARY OF THE INVENTION

The present invention seeks to address the problems of the prior art.

Accordingly, a first aspect of the present invention provides a venturi device for a combined sewage overflow system, the venturi device comprising a body defining a fluid passageway therethrough, the body having a first end portion defining a fluid inlet; a second end portion opposing the first end portion, the second end portion defining a fluid outlet and an opposing venturi inlet in fluid communication with the fluid outlet: and a mid-portion located between the first and second end portions; and a venturi pipe located between the first fluid outlet and the venturi inlet and in fluid communication with both, wherein the venturi pipe is narrower in cross section than the venturi inlet and wherein the fluid inlet comprises an intake funnel that decreases in width in a direction towards the fluid passageway. The funnel shape facilitates in drawing off of debris across the full width of the screen whilst reducing the hydraulic resistance of the venturi inlet, known as the 'sharp entry factor' i.e. the entrance resistance coefficient K (Darcy-Weisbach formula).

In one embodiment, the intake funnel is a concentric reducer.

Alternatively, the intake funnel may be an eccentric reducer. This facilitates with avoiding a build-up of silt during use along the entrance to the venturi device, resulting in a loss of performance. Any bottom hanging silt will be able to flow unrestricted into the venturi pipe.

In a further embodiment, the fluid outlet comprises an outlet funnel that increases in width in a direction away from the fluid passageway.

The outlet funnel may be a concentric reducer.

Alternatively, the outlet funnel may be an eccentric reducer. This facilitates the unrestricted flow of any bottom hanging silt away from the venturi pipe and onto the Treatment Works.

Preferably, the intake funnel is quadrilateral in cross-section. However, it is to be appreciated that the intake funnel may comprise any other suitable cross-section such as, but not limited to, circular or oval in cross-section.

In one embodiment, the venturi pipe is operable to mix fluid from the venturi inlet with fluid from the fluid inlet. Alternatively, under flood conditions, the venturi pipe is operable to mix effluent from the venturi inlet with fluid from the fluid inlet.

In a further embodiment, the circumferential diameter of the fluid outlet is greater than the circumferential diameter of the venturi pipe.

A further aspect of the present invention provides a combined sewage overflow system comprising:
(i) a CSO having a body comprising
   a first chamber;
   an escape chamber adjacent the first chamber and separated from the first chamber by a perforated screen, wherein the first chamber and the escape chamber are in fluid communication with one another;
   a second chamber adjacent the first chamber and in fluid communication with the first chamber;
   an effluent inlet for effluent ingress into the first chamber; and
   an effluent outlet for effluent egress from the second chamber; and
(ii) a venturi device in accordance with a first aspect of the present invention,
   wherein the fluid inlet is arranged within the first chamber and adjacent the perforated screen to receive fluid from the first chamber, and the venturi inlet is arranged to receive fluid from the first chamber distal to the perforated screen.

Preferably, the second chamber is located downstream of the first chamber.

In one embodiment, the fluid outlet of the venturi device is arranged within the second chamber.

Under non-flood conditions, effluent enters the body of the CSO through effluent inlet into the first chamber. Effluent flowing through the CSO is forced by pressure Head into the venturi inlet and into the narrower venturi pipe. Increased flow velocity and reduced pressure within the venturi pipe will result in draw down of fluid flow (which will initially be air) through the fluid passageway from the first chamber via the fluid inlet.

Under flood conditions, the level in the first chamber will rise and, as it does so, will eventually rise to the level of the fluid inlet. The draw down of fluid flow (which will be effluent once the level in the chamber reaches the fluid inlet) will encourage sewage solids and rag away from the perforated screen, thereby serving to reduce the percentage solids content at the screen and assist with preventing the screen from becoming blocked during flood events.

In one embodiment, the body further defines an escape outlet in the escape chamber thereby defining a fluid passageway between the escape chamber and the exterior of the CSO body, allowing fluid egress from the escape chamber. It is through the escape outlet that effluent can leave the CSO and be released, for example, into the watercourse. However, whilst effluent from the escape outlet is normally released into the watercourse (during flood events), it is to be appreciated that effluent exiting from the escape outlet may be channeled to a holding tank, transported onwards to alternative treatment facilities or otherwise released into the environment, whether immediate or remote from the CSO itself.

Thus, under flood conditions, the fluid level in the first chamber will rise above the level of the perforated screen, sewage solids and rag will be prevented from passing through the perforated screen and be retained in the first chamber, whilst screened effluent will enter into the escape chamber and leave the CSO through the escape outlet in the escape chamber and be released from the CSO into, for example, the watercourse.

Preferably, the body further comprises an effluent channel providing a fluid passage between the effluent inlet and the effluent outlet, the channel being arranged along a portion of a base of the chamber and extending through the first chamber and the second chamber.

In a further embodiment, the venturi inlet is arranged at least partially within the effluent channel. Therefore, in use, water flows into the CSO via the effluent inlet into the effluent channel in the first chamber where it passes through the first chamber and into the second chamber and exits the CSO via the effluent outlet. Thus, effluent flowing through the CSO is forced by pressure Head into the venturi inlet and into the narrower venturi pipe, resulting in draw down of flow (which is initially air under non-flood conditions and is effluent when the effluent level rises sufficiently under flood conditions to cover the venturi device fluid inlet) through the passageway from the fluid inlet adjacent the perforated screen to the fluid outlet in the second chamber. Preferably, the fluid outlet is located adjacent the effluent channel and effluent exiting the fluid outlet is delivered into the effluent channel where it flows to the effluent outlet and out of the CSO and onward for sewage treatment.

In a further embodiment, the body further comprises a weir partition arranged between the second chamber and the escape chamber, wherein the weir partition extends from the base of the body to above the level of the perforated screen. The weir partition is provided as a failsafe measure should the perforated screen block. Thus, during a flooding event, should the perforated screen in the first chamber become blocked, the effluent level in the second chamber will rise above the level of the weir partition, resulting in unscreened effluent to passing over the weir partition and into the escape chamber, thereby allowing unscreened effluent (including sewage solids and rag) to leave the CSO via the escape outlet.

Preferably, the second chamber is defined by a portion of the body and at least a portion of the weir partition.

Preferably, the escape chamber is defined by a portion of the body, at least a portion of the weir partition and at least a portion of the perforated screen.

BRIEF DESCRIPTION OF THE DRAWINGS

An embodiment of the invention will now be described, by way of example only, and with reference to the accompanying drawings, in which:

FIG. 21A is a front view of the venturi device of FIG. 19, and

FIG. 21B is a rear view of the venturi device of FIG. 19.

FIG. 22 is a view from above of the venturi device of FIG. 19.

DETAILED DESCRIPTION OF THE INVENTION

The same figure references are used throughout the figures to indicate the same features.

Figure 4:
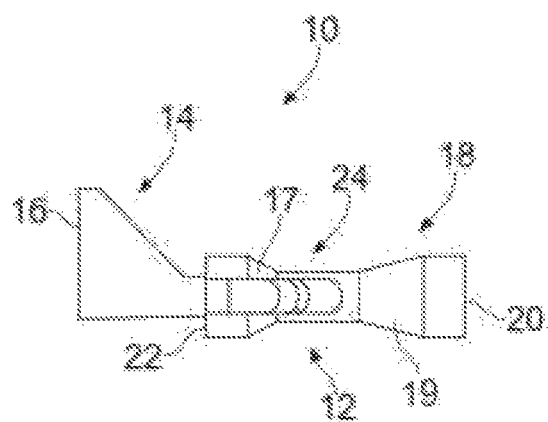
FIG. 4 is a plan view of the venturi device of FIG. 1.
Figure 1:
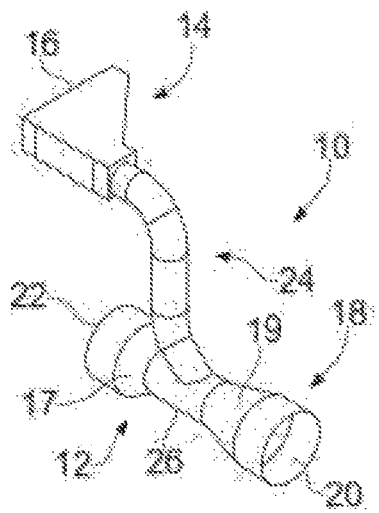
FIG. 1 is a perspective view of a first embodiment of a venturi device in accordance with a first aspect of the present invention.
Figure 2:
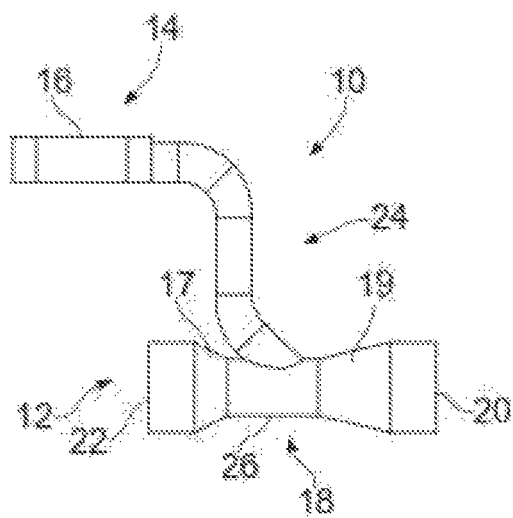
FIG. 2 is a side view of the venturi device of FIG. 1.
Figure 3:
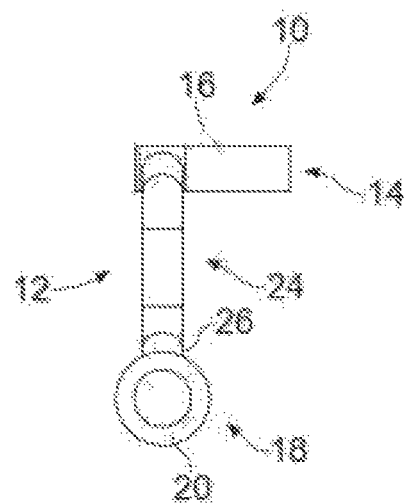
FIG. 3 is a front view of the venturi device of FIG. 1.
Figure 6:
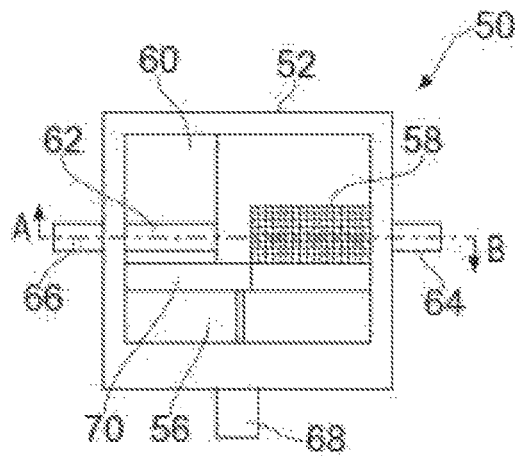
FIG. 6 is a view from above of the CSO system of FIG. 5.
Figure 5:
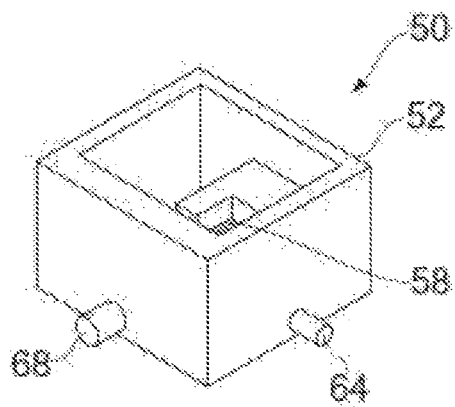
FIG. 5 is a perspective view of a first embodiment of a combined sewage overflow (CSO) system in accordance with a second aspect of the present invention with the venturi device omitted.
Figure 7:
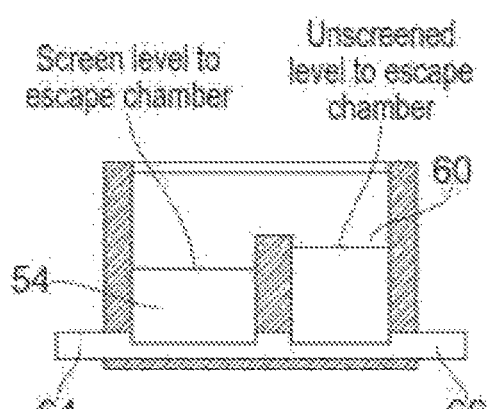
FIG. 7 is a cross-sectional view through B-B in FIG. 6.
Figure 9:
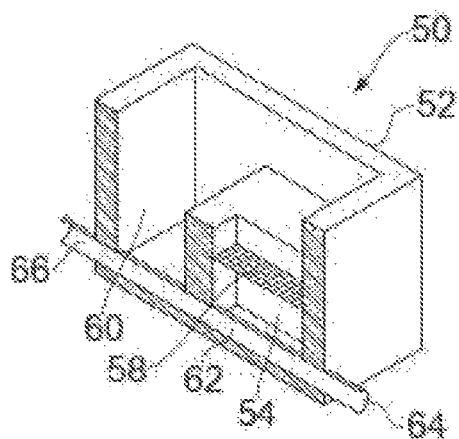
FIG. 9 is a cut-away perspective view of the CSO system of FIG. omitting the escape chamber.
Figure 8:
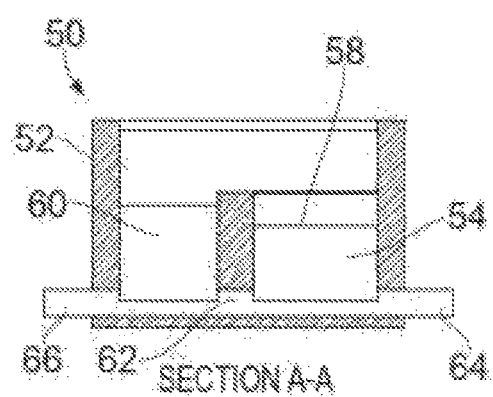
FIG. 8 is a cross sectional view through A-A in FIG. 6.
Figure 10:
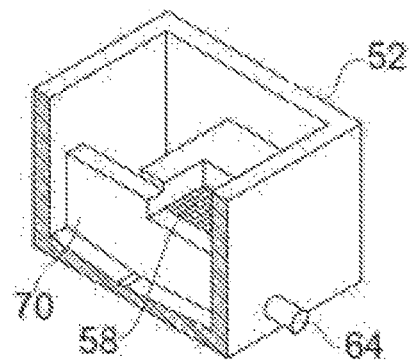
FIG. 10 is a cut-away perspective view of the CSO system of FIG. 5 including the escape chamber.
Figure 14:
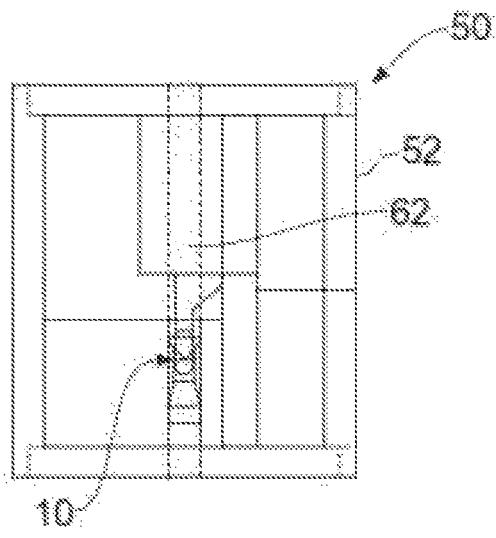
FIG. 14 is a view from above of the embodiment of FIG. 11.
Figure 11:
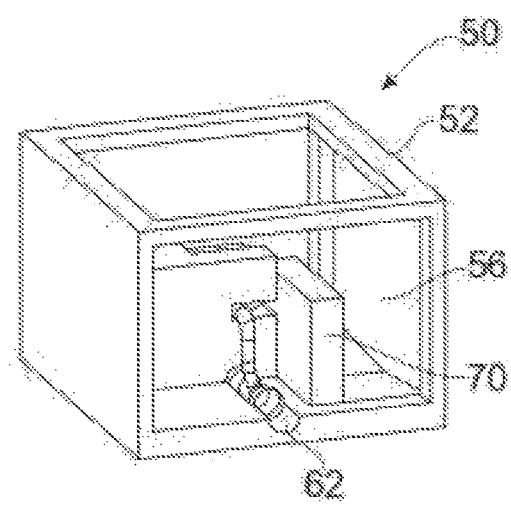
FIG. 11 is a perspective view of the CSO system of FIG. 5 with the venturi device included.
Figure 13:
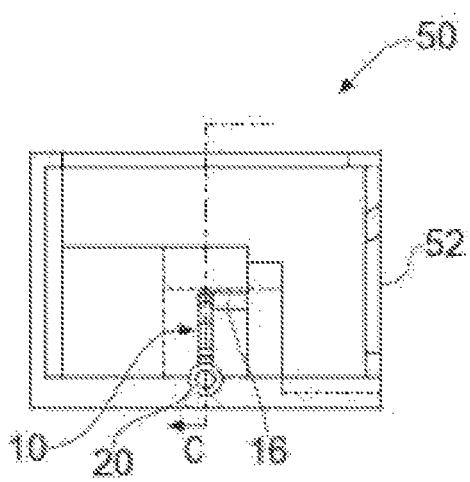
FIG. 13 is a view from the front of the embodiment of FIG. 11.
Figure 12:
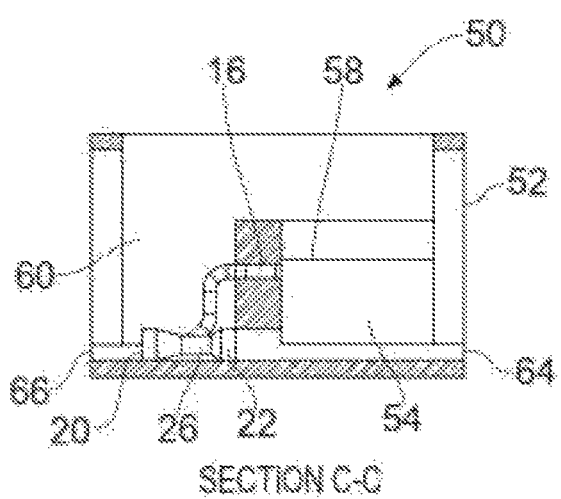
FIG. 12 is a cross-sectional view of the embodiment of FIG. 11.
Figure 16:
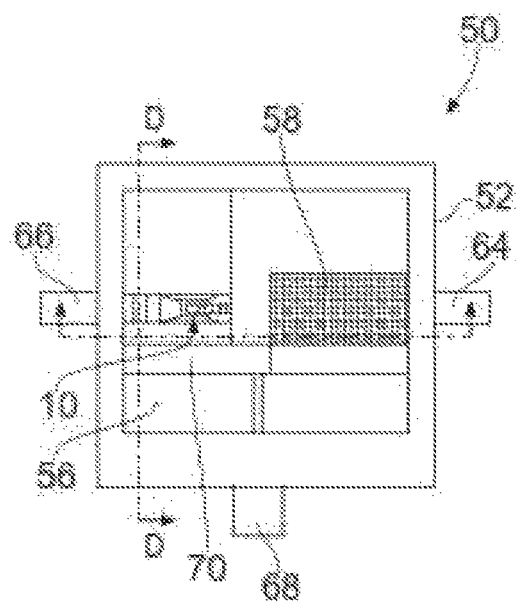
FIG. 16 is a view from above of the embodiment of FIG. 11.
Figure 18:
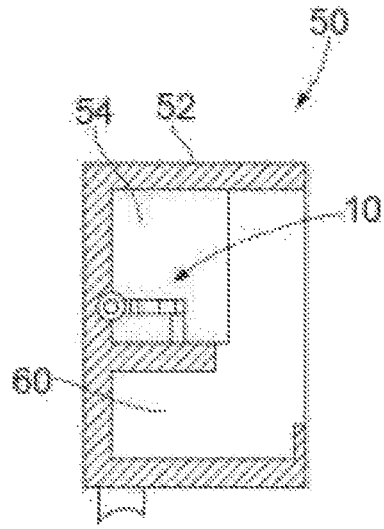
FIG. 18 is a cross-sectional view through D-D in FIG. 16.
Figure 17:
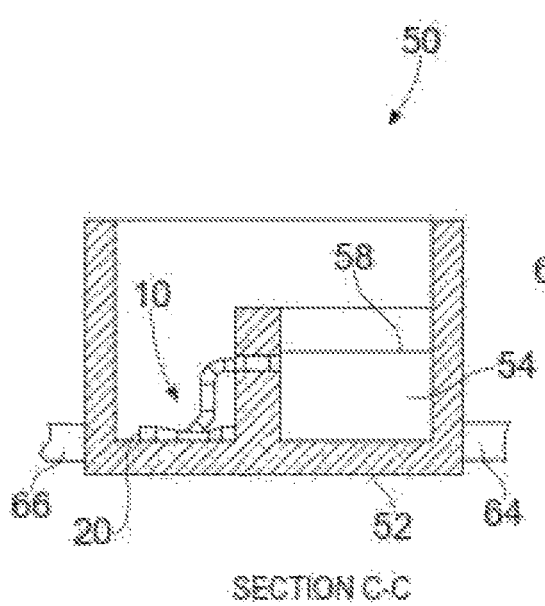
FIG. 17 is a cross-sectional view through C-C in FIG. 16.
Figure 15:
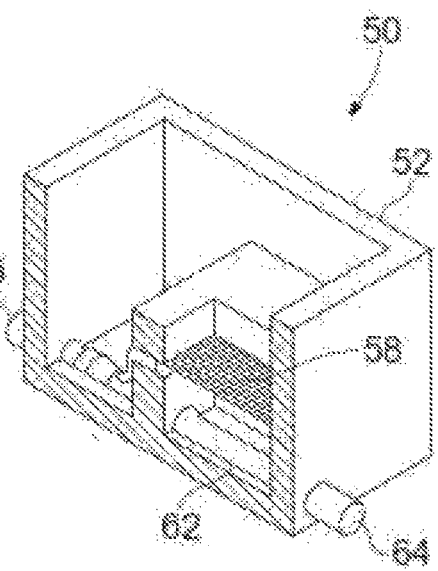
FIG. 15 is a cut-away perspective view of the embodiment of FIG. 11.
Figure 19:
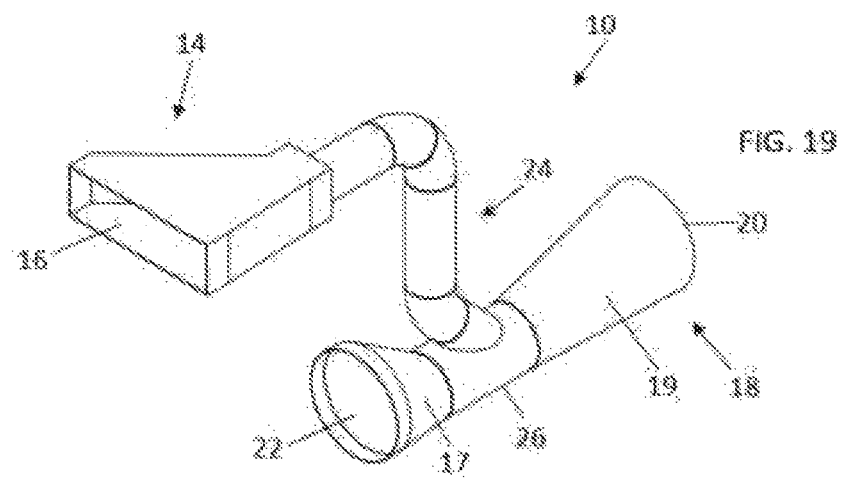
FIG. 19 is a perspective view of a first embodiment of a venturi device in accordance with a second aspect of the present invention.
Figure 20:
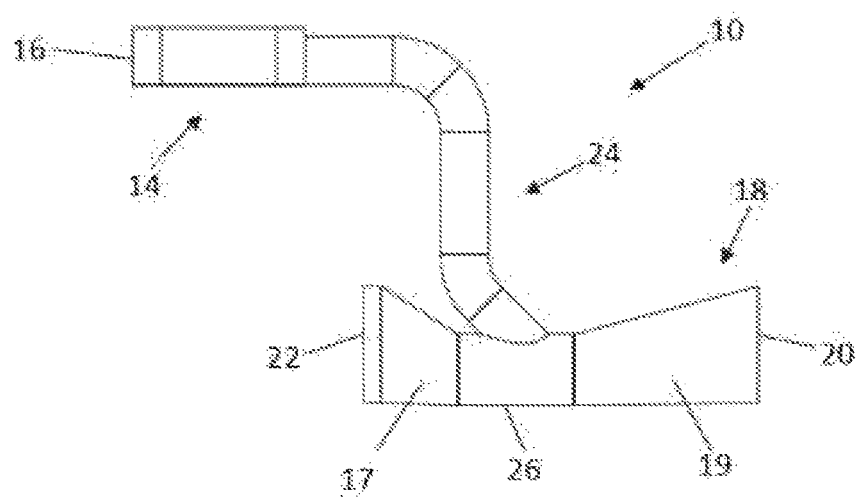
FIG. 20 is a side view of the venturi device of FIG. 19.

FIGS. 1 to 4 show various views of a first embodiment of a venturi device in accordance with a first aspect of the present invention. FIGS. 5 to 10 show various views of a typical CSO forming part of an embodiment of a CSO system in accordance with a second aspect of the present invention. FIGS. 11 to 18 show various views of the venturi device of FIGS. 1 to 4 located within the CSO of FIGS. 5 to 10 to form an embodiment of a CSO system in accordance with a second aspect of the present invention. FIGS. 19 to 21B show a second embodiment of a venturi device in accordance with a second aspect of the present invention.

Venturi device 10 comprises a body 12 defining a fluid passageway therethrough. Body 12 has a first end portion 14 defining a fluid inlet 16, and a second end portion 18 opposing the first end portion 14, the second end portion 18 defining a fluid outlet 20. Body 12 further defines a venturi inlet 22 opposing the fluid outlet 20 and in fluid communication with fluid outlet 20. Fluid outlet 20 has an increased circumferential diameter when compared with that of the venturi pipe 26.

Venturi device 10 further comprises a mid-portion 24 located between the first and second end portions 14, 18.

A venturi pipe 26 is located between the fluid outlet 20 and the venturi inlet 22 and is in fluid communication with both fluid outlet 20 and venturi inlet 22. Venturi pipe 26 has a reduced circumferential diameter when compared with that of venturi inlet 22.

Fluid inlet 16 comprises an intake funnel that decreases in circumferential diameter in a direction towards mid-portion 24. The intake funnel in the illustrated embodiment is quadrilateral in cross-section. However, it is to be appreciated that any other suitable cross-sectional shape may be used, such as but not limited to, circular, oval, pentagonal or the like.

In use, fluid receive through venturi inlet 22 is mixed with fluid from fluid inlet 22 in venturi pipe 26.

CSO 50 comprises a body 52 having first chamber 54 and an escape chamber 56 located adjacent first chamber 54 and separated from first chamber 54 by a screen 58. As screen 58 is provided with perforations, first chamber 54 and escape chamber 56 are in fluid communication with one another.

A second chamber 60 is located adjacent first chamber 54 and is in fluid communication with first chamber 54 via effluent channel 62. Effluent channel 62 extends from effluent inlet 64 located in body 52 through first chamber 54 into second chamber 60 towards effluent outlet 66. Effluent enters the CSO body 52 via effluent inlet 64 in first chamber 54 and exits the CSO body 52 via effluent outlet 66 in second chamber 60 and enters a pipeline (not shown) to a sewage treatment facility.

Venturi device 10 is located within the CSO body 52 such that the fluid inlet 16 receives effluent from first chamber 54, venturi inlet 16 is located adjacent the effluent channel in first chamber 54 and receives fluid from effluent inlet 64. The fluid received through venturi inlet 16 may comprise air, effluent or a mixture of the two depending on the level of effluent in CSO 50.

Fluid outlet 20 is arranged within second chamber 16 distal to effluent inlet 64 and receives fluid from venturi inlet 16 via venturi pipe 26. Fluid outlet 20 then delivers fluid into effluent channel 62 where it flows to effluent outlet 66 and exits the CSO body and flows onwards for sewage treatment.

CSO body 52 further defines an escape outlet 68 located in escape chamber 56 through which fluid received in escape outlet 68 can exit the CSO body and be released into the environment e.g. watercourse or the like.

CSO body 52 further comprises a weir partition 70 located between effluent channel 62 and escape chamber 56. Weir partition 70 extends from the base of CSO body 52 to above the level of perforated screen 58.

Perforated screen 58 is a fixed perforated plate fabricated from stainless-steel screen. However, it is to be appreciated that any other suitable material known to the skilled person and suitable for purpose may be used as an alternative. Screen 58 is provided with circular perforations of 6 mm in diameter. However, it is to be appreciated that the perforations could be any other suitable shape, including square and of alternative dimension provided that the dimensions are suitable to prevent sewage solids and rag from passing through the screen and into escape chamber 56.

In a flooding event, effluent flow rate through effluent channel 62 will increase and, until the flooding dissipates, the sewage level in first chamber 54 will continue to rise. The speed at which the effluent level rises is dependent upon the level of flooding and the increase in effluent entering the sewerage system. When a certain flow limit is exceeded, the effluent level within first chamber 54 will rise to the level of the perforated screen 18 and be forced to pass through it. The screened effluent will then flow into escape chamber 56 and be released from the CSO 50 via escape outlet 66 and into the environment via an output pipe (not shown) which leads to the watercourse. Sewage solids and rag are retained in first chamber 54 by screen 58. When the flood conditions abate and the effluent levels fall in the first and second chambers, the hitherto trapped rag (other than that embedded in the screen) will pass forward through effluent outlet 66 and onward to the Treatment Works.

Fluid inlet 16 of venturi device 10 is located near to and just below the level of perforated screen 58 in first chamber 54. In use, venturi device 10 acts to continually draw down a flow from near to the perforated screen 58 through fluid inlet 16 in first chamber 54 during a flood event. This draw down of flow is induced by the action of the venturi pipe 26 located in the fluid passageway in venturi device body 12. The fluid flow into the venturi pipe 26 is forced by pressure from the wider venturi inlet 18 via first tapered portion (converging section) 17 into the narrower venturi pipe 26, which increases the velocity of the fluid flow and reduces the pressure within venturi pipe 26. Fluid flow from fluid inlet 16 is then drawn down through the fluid passageway in venturi device body 12 to the venturi pipe 26 by means of the reduced pressure within venturi pipe 26, where it combines with the fluid flow in venturi pipe 26 and out via second tapered portion 19 (diverging section) towards the fluid outlet 20. On exiting through fluid outlet 20 in second chamber 60, effluent flow passes into effluent channel 62 and flows towards effluent outlet 66, where it exits the CSO body and flows onwards for sewage treatment.

Rather than sewage solids and rag being retained at the screen 58 as would be the normal situation with conventional CSO screens, the draw down flow under pressure serves to dislodge some or all of the sewage solids and rag and draw them back down into the fluid flow, thereby reducing the percentage of rag in the mixture and thus assisting in keeping the screen clear from potential blockages due to lodged debris.

Thus, the action in venturi pipe 26 coupled with the draw down induced fluid flow from fluid inlet 16 serves to feed the sewage waste, including dislodged sewage solids and rag from screen 58 through the venturi device body 12 and towards fluid outlet 20 in second chamber 60.

It is to be noted and appreciated that the venturi device 10 of the CSO system of the present invention operates to keep the screen 58 clear of sewage solids and rag without the need for any external power source or mechanical assistance and operates by exploiting the hydraulics of a venturi.

Therefore, the present invention is continually reducing the solids content accumulating in the first chamber 54. Further, there is reduced burden on the perforated screen 58 as the screen remains unblocked, improving screen performance and promoting it to operate more efficiently during flood events. There is reduced maintenance requirement as cleaning will not be required on the frequent basis currently required by conventional CSO systems. Finally, there is a reduced requirement for an increased screen area to compensate for gradual screen blockage, thereby reducing the material and manufacturing costs and potentially the size of the CSO device itself.

In the first embodiment of a venturi device described in FIGS. 1 to 4, tapered sections 17 and 19 are concentric reducers i.e. the cone-shape reduces or enlarges equally about a centre line.

In the second embodiment of a venturi device described in FIGS. 19 to 21B, the tapering sections 17 and 19 are eccentric reducers i.e. the taper is only on the one side of respective converging and diverging sections. The advantage of using such a design is that it encourages any bottom hanging silt to flow unrestricted through the venturi device and onward to the treatment works, thereby avoiding the potential for build up of silt along the entrance to the venturi and the consequential loss of performance that can be experienced when this occurs.

Although aspects of the invention have been described with reference to the embodiment shown in the accompanying drawings, it is to be understood that the invention is not limited to the precise embodiment shown and that various changes and modifications may be effected without further inventive skill and effort. For example, rather than being released to the environment, non-solid effluent from escape chamber 56 may be fed into large holding tanks for future treatment or release post-flood event. Although the embodiment shown includes only one venturi device 10, more than one venturi device 10 may be included in a single CSO system in accordance with a second aspect of the present invention.

The invention claimed is:

1. A combined sewage overflow system comprising: (i) a Combined Sewer Overflow (CSO) body comprising a first chamber; an escape chamber arranged adjacent the first chamber and separated from the first chamber by a perforated screen, wherein the first chamber and the escape chamber are in fluid communication with one another; a second chamber arranged adjacent the first chamber and in fluid communication with the first chamber, wherein the CSO body defines an effluent inlet for effluent ingress into the first chamber; and wherein the CSO body defines an effluent outlet for effluent egress from the second chamber; and (ii) a Venturi device located within the CSO body, the Venturi device comprising: a Venturi body defining a fluid passageway therethrough, the Venturi body having a first end portion defining a fluid inlet; a second end portion opposing the first end portion, the second end portion defining a fluid outlet and an opposing Venturi inlet in fluid communication with the fluid outlet: and a mid-portion located between the first and second end portions; and a Venturi pipe located between the fluid outlet and the Venturi inlet and in fluid communication with both, wherein the Venturi pipe is narrower in cross section than the Venturi inlet, and wherein the fluid inlet comprises an intake funnel that decreases in width in a direction towards the fluid passageway, wherein the fluid inlet is arranged within the first chamber and adjacent the perforated screen to receive fluid from the first chamber, and the Venturi inlet is arranged to receive fluid from the first chamber distal to the perforated screen.

2. A system as claimed in claim 1, wherein the fluid outlet of the venturi device is arranged within the second chamber.

3. A system as claimed in claim 1, wherein the CSO body further defines an escape outlet in the escape chamber thereby defining a fluid passageway between the escape chamber and an exterior of the CSO body.

4. A system as claimed in claim 1, wherein the CSO body further comprises an effluent channel providing a fluid passage between the effluent inlet and the effluent outlet, the effluent channel being arranged along a portion of a base of the CSO body and extending through the first chamber and the second chamber.

5. A system as claimed in claim 1, wherein the CSO body further comprises an effluent channel providing a fluid passage between the effluent inlet and the effluent outlet and a weir partition arranged between the effluent channel and the escape chamber, wherein the weir partition extends from a base of the CSO body to above a height of the perforated screen.

6. A system as claimed in claim 5, wherein the second chamber is defined by a portion of the CSO body and at least a portion of the weir partition.

7. A system as claimed in claim 5, wherein the escape chamber is defined by a portion of the CSO body, at least a portion of the weir partition and at least a portion of the perforated screen.

\* \* \* \* \*